(12) United States Patent
Gieseke

(10) Patent No.: US 10,704,538 B2
(45) Date of Patent: Jul. 7, 2020

(54) METHOD TO FORM IMPULSE JET

(71) Applicant: The United States of America as represented by the Secretary of the Navy, Newport, RI (US)

(72) Inventor: Thomas J Gieseke, Warren, RI (US)

(73) Assignee: The United States of America as represented by the Secretary of the Navy

( * ) Notice: Subject to any disclaimer, the term of this patent is extended or adjusted under 35 U.S.C. 154(b) by 158 days.

(21) Appl. No.: 16/139,105

(22) Filed: Sep. 24, 2018

(65) Prior Publication Data

US 2019/0024645 A1 Jan. 24, 2019

Related U.S. Application Data

(62) Division of application No. 15/185,207, filed on Jun. 17, 2016, now Pat. No. 10,113,538.

(51) Int. Cl.
| | | |
|---|---|---|
| *F04B 9/04* | (2006.01) | |
| *F04B 53/14* | (2006.01) | |
| *F04B 9/06* | (2006.01) | |
| *F04B 19/22* | (2006.01) | |
| *F04B 23/02* | (2006.01) | |
| *F04B 53/16* | (2006.01) | |
| *F04B 9/02* | (2006.01) | |
| *F04B 17/03* | (2006.01) | |
| *F16H 57/08* | (2006.01) | |

(Continued)

(52) U.S. Cl.
CPC ............... *F04B 9/042* (2013.01); *F04B 9/02* (2013.01); *F04B 9/06* (2013.01); *F04B 19/22* (2013.01); *F04B 23/028* (2013.01); *F04B 53/14* (2013.01); *F04B 53/16* (2013.01); *F16H 1/28* (2013.01); *F16H 57/082* (2013.01); *F16H 57/10* (2013.01); *F04B 17/03* (2013.01); *F16H 2057/085* (2013.01)

(58) Field of Classification Search
CPC .... F04B 9/042; F04B 9/02; F04B 9/06; F04B 19/22; F04B 23/028; F04B 53/14; F04B 17/03; F16H 1/28; F16H 57/082; F16H 57/10; F16H 2057/085
USPC ........................................................ 417/415
See application file for complete search history.

(56) References Cited

U.S. PATENT DOCUMENTS

| | | | | |
|---|---|---|---|---|
| 18,829 A | * | 12/1857 | Vanderwerken | ...... F16H 57/082 475/331 |
| 571,890 A | * | 11/1896 | Steffens | ................ F16H 57/082 475/348 |

(Continued)

*Primary Examiner* — Connor J Tremarche
(74) *Attorney, Agent, or Firm* — James M. Kasischke; Michael P. Stanley

(57) ABSTRACT

An impulse pump is provided with a low power motor to store rotational kinetic energy in a flywheel. The stored kinetic energy is released using a planetary gear transmission that links the flywheel to a pusher shaft. The kinetic energy is released when the planetary gear carrier is decelerated using a caliper brake. The planetary gear carrier deceleration forces rotational acceleration of the pusher shaft and deceleration of the flywheel. Through a cam roller contact point between the pusher shaft and the cam raceway on the plunger; the rotational motion of the pusher shaft is converted to linear and translational motion of the plunger. The translational motion of the plunger allows impulse jet energy to be rapidly released from a nozzle of the pump.

1 Claim, 15 Drawing Sheets

(51) Int. Cl.
*F16H 1/28* (2006.01)
*F16H 57/10* (2006.01)

(56) References Cited

U.S. PATENT DOCUMENTS

| | | | | |
|---|---|---|---|---|
| 6,286,635 | B1 * | 9/2001 | Tamor | B60L 7/26 180/65.21 |
| 8,528,649 | B2 * | 9/2013 | Kolle | F16K 31/12 166/373 |
| 2003/0022751 | A1 * | 1/2003 | Amparore | B25J 9/102 475/339 |
| 2006/0249067 | A1 * | 11/2006 | Rayner | B63G 8/30 114/238 |
| 2011/0192277 | A1 * | 8/2011 | Fujiwara | F04B 53/18 92/153 |
| 2015/0292493 | A1 * | 10/2015 | Suzuki | F04B 9/042 74/56 |
| 2016/0050850 | A1 * | 2/2016 | Bonte | A01F 15/04 56/10.7 |

* cited by examiner

METHOD TO FORM IMPULSE JET

The present invention is a continuation application and claims the benefit of U.S. application Ser. No. 15/185,207 filed on Jun. 17, 2016 by the inventor Thomas J. Gieseke with the invention entitled "Impulse Pump".

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention relates to an impulse pump for generating a pulsed fluid jet.

(2) Description of the Prior Art

High velocity water jets are used in water jet cutting systems. Methods and systems exist to generate high pressures (often over 345 MegaPascals) needed for the high velocity water jets. A known system is to use a reciprocating piston pump to produce fluid flow at a fixed flow rate and pressure.

In operation, the output of the reciprocating pump is sent to a reservoir or attenuator capable of handling high pressure and is then discharged through a valve or orifice. This type of system is designed to provide a steady jet of high velocity water. However, the system is not adaptable for providing short duration pulses of water.

High-velocity (exceeding 300 meters per second) short-duration (less than 1 second) water jets can be used in underwater demolition by utilizing the effects of water-hammer and cavitation bubble collapse. Technical challenges related to generating the high-velocity short-duration water jets include: storage of mechanical energy; a rapid release of the stored energy; and conversion of the released energy to form a water jet. For example, in U.S. Pat. No. 7,926,587, entitled "Explosive Water Jet with Precursor Bubble", a method is described for creating a pulsed water jet by using explosively released chemical energy.

Other systems exist to convert stored mechanical energy to an impulse started motion (an impact). In these systems, a mechanical spring is slowly compressed and then quickly and fully released to provide a sudden burst of energy to drive the impulse motion.

Other methods to store energy can be used to drive an impulse or impact device. Pneumatic and hydraulic systems can store energy that is released through a rapidly activated valve. Also, electrical energy can be converted to mechanical motion through electromagnetic forces such as electrical solenoids.

Desired characteristics of an improved energy storage and release systems are that the apparatus, device, or system has: a higher energy stored per unit mass of the overall system; a higher efficiency of energy conversion during energy release; and a rapid rate of energy release.

SUMMARY OF THE INVENTION

It is therefore an object of the present invention to provide an impulse pump that can quickly release water jet energy.

To attain the object described, the present invention assembles components suitable for: storage of energy in the form of rotational kinetic energy; a rapid release of the stored energy; conversion of the released rotational energy into linear motion; and a use of the linear motion to pressurize fluid with impulse energy.

The present invention uses a low power motor to store rotational kinetic energy in a flywheel. The stored energy is released using a planetary gear transmission that links the flywheel to a pusher shaft. The energy release is achieved when the planetary gear carrier is decelerated using a caliper brake. The planetary gear carrier deceleration forces rotational acceleration of the pusher shaft and deceleration of the flywheel. Through a cam roller contact point between the pusher shaft and the cam raceway on the plunger; the rotational motion of the pusher shaft is converted to a linear and translational motion of a plunger device. The translational motion of the plunger rapidly empties a reservoir of the pump and creates a highly pressurized fluid path exiting a nozzle of the pump.

The pressurized fluid can drive a high-velocity short-duration water jet, with the qualities of a high energy storage-to-system weight ratio, efficient energy conversion, and a rapid energy release. Additionally, the present invention combines components known in the art, including an electric motor, a flywheel, a planetary gear clutch, hydraulic caliper brakes, a barrel type cam and follower, a piston pump, a reservoir, and a nozzle to assemble the inventive pump.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAILED DESCRIPTION OF THE INVENTION

Water jet pulses are useful in cutting and demolition applications. The instantaneous pump power requirements to create water jet pulses are high relative to a system imparting an equivalent average energy to a water stream at a uniform flow rate. To create a high energy water jet pulse; energy can be transferred into the system using a relatively low power drive which is stored in a rotation of a flywheel. Energy can be rapidly released by converting the rotational motion of the flywheel into a linear motion of a piston or plunger.

Figure 1:
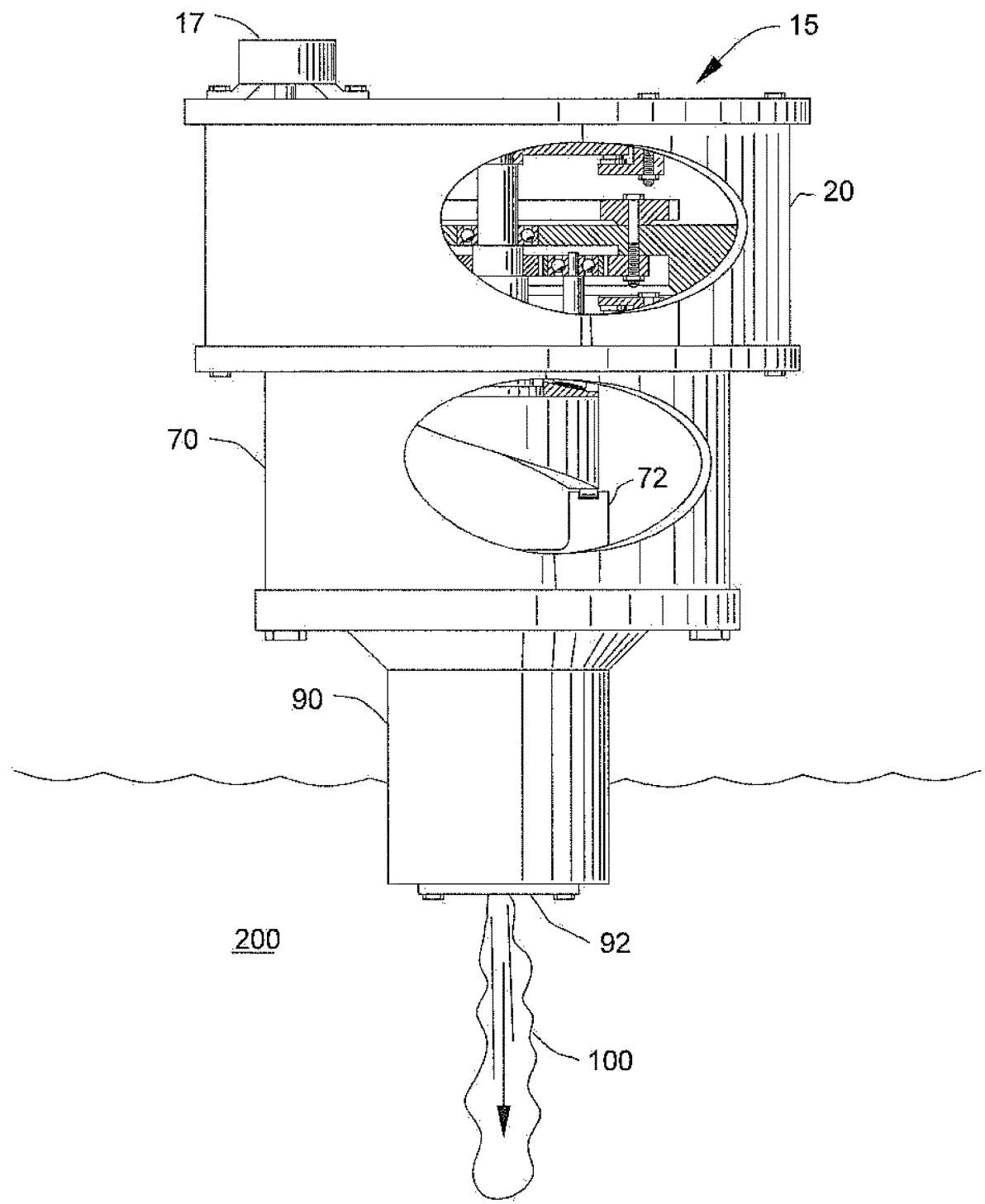
FIG. 1 depicts an impulse pump built according to the teachings of the present invention with a portion of the housing removed to show internal components of the pump.
Figure 2:
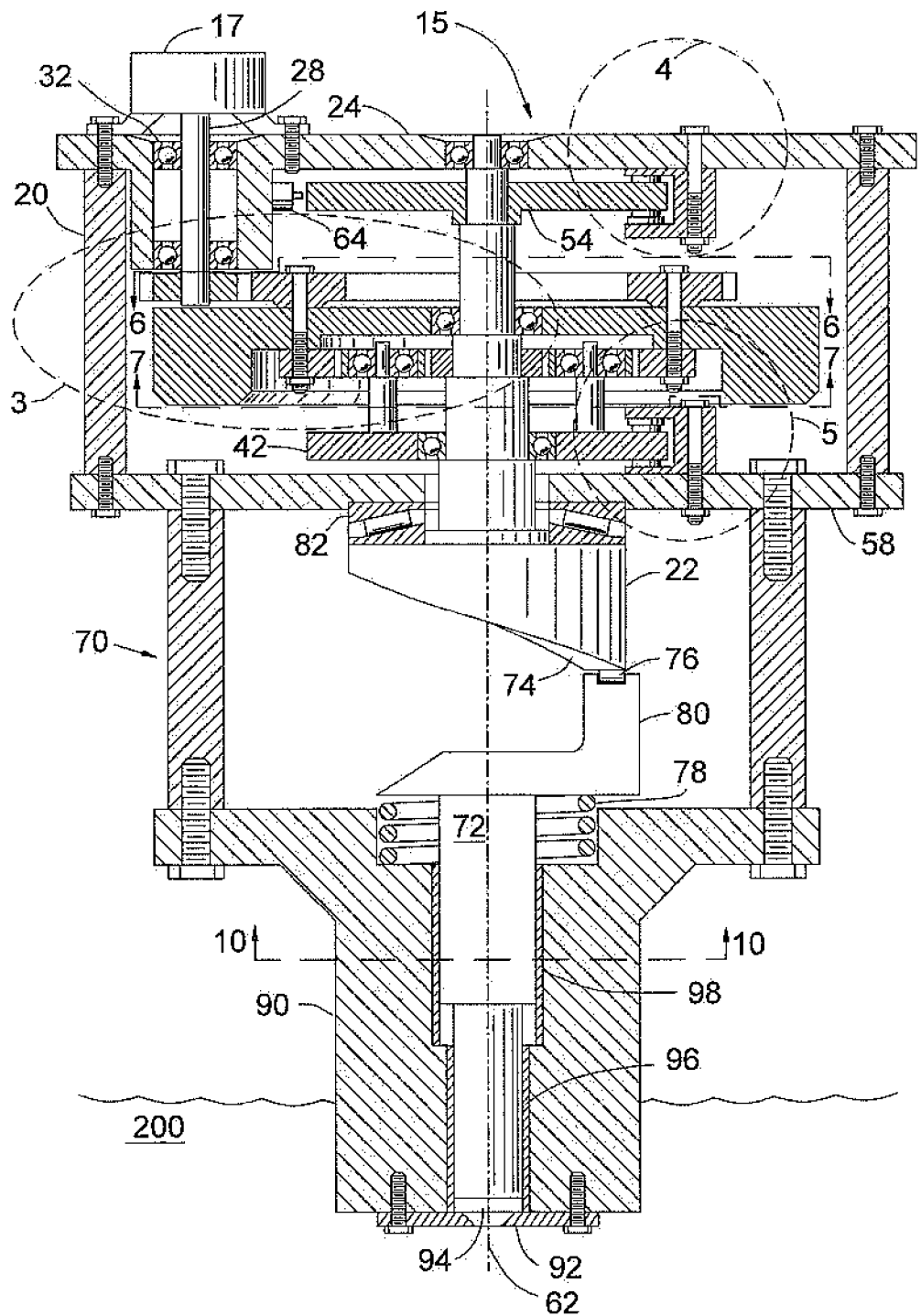
FIG. 2 depicts a cross-section of the impulse pump of the present invention.

A preferred embodiment of an inventive impulse pump 15 is shown in FIG. 1. In the figure, the pump 15 generally comprises a drive motor 17, a planetary gear and flywheel gear box housing 20, a cam assembly housing 70 attached to the gear box housing 20, a plunger 72, a head block 90, and a nozzle 92. Details of the gear box housing 20, the cam assembly housing 70 and the head block 90 are depicted in FIG. 2 through FIG. 10.

In operation, linear motion of the plunger 72 forces fluid through the nozzle 92 to form an impulse jet 100 into a liquid environment 200 or other suitable environment. The impulse jet formation is achieved by alternately drawing fluid into a reservoir 94 through the nozzle 92 from the liquid environment 200 and subsequently forcing the fluid from the reservoir through the nozzle into the liquid environment 200.

The fluid is drawn into the reservoir 94 when rotating a pusher shaft 22 in a first angular direction to a second angular position in a rotation direction. An impulse pulse of fluid thru the nozzle 92 is created when the pusher shaft 22 is rotated in from the second angular position to the first angular position in the same rotational direction; thereby, completing a full rotation. Rotating the pusher shaft 22 results in the movement of a cam race-way 74. This movement changes the axial location of a contact point between a cam roller 76 and the cam race-way 74 relative to the nozzle 92. Contact between the plunger 72 and the cam race-way 74 is maintained by a spring 78.

An impulse jet 100 is formed by forcing liquid out of the reservoir 94 through the nozzle 92 by downward motion of the plunger 72. The downward motion is forced by rotation of the pusher shaft 22 with the associated movement of the cam race-way 74. Rotation of the pusher shaft 22 causes a cam follower arm 80 to be forced downward through the cam roller 76 as the contact roller follows the cam race-way 74. A sleeve bearing 98 is placed between the plunger 72 and the head block 90 to minimize friction and to prevent flow of fluid from the reservoir 94 into the cam assembly housing 70 when drawing water into or expelling water from the reservoir.

In a further description of the arrangement of the impulse pump 15; the drive motor 17 is mounted to a base plate 24. The drive motor 17 drives a flywheel rim gear 26 through a drive shaft 28 and a drive gear 30 (See FIG. 3). Roller bearings 32 or their equivalent are positioned at moving areas throughout the pump 15 in order to reduce friction in those areas. The bearings are not all identified in the figure but have generally the same shape and function as the identified bearing 32.

Figure 3:
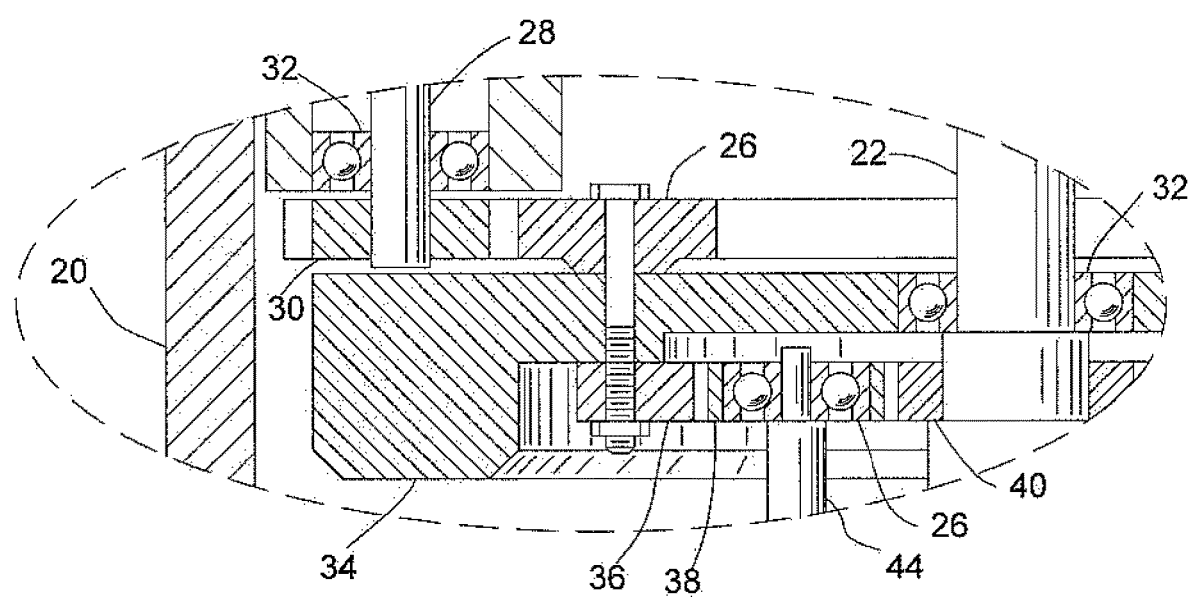
FIG. 3 depicts an enlarged view taken from FIG. 2 as sectioned area 3-3.
Figure 4:
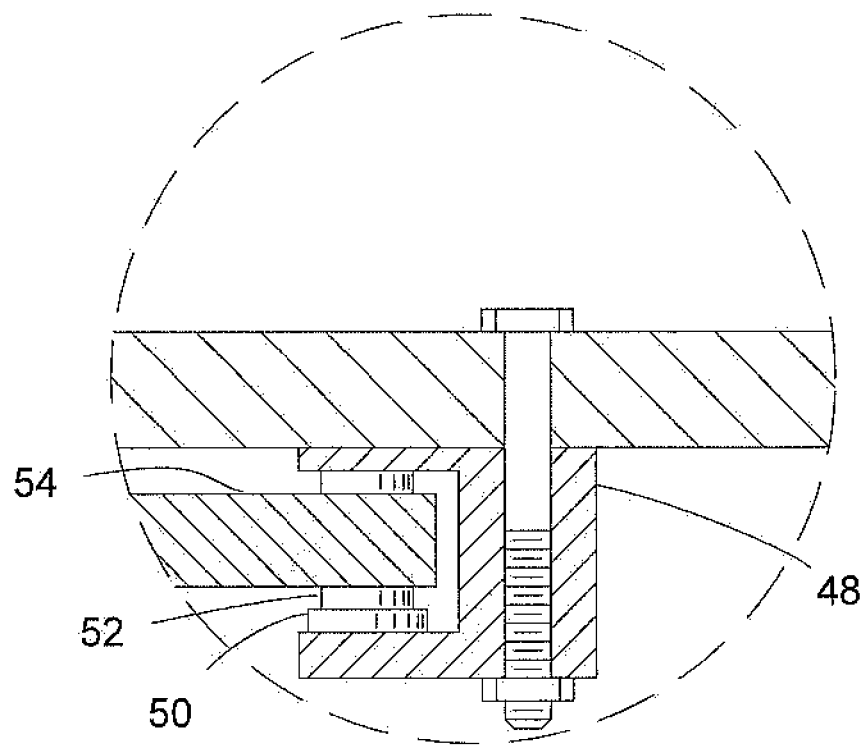
FIG. 4 depicts an enlarged view taken from FIG. 2 as sectioned area 4-4.

In FIG. 3, the drive gear 30 engages with the flywheel drive gear 26 which is attached to a flywheel 34. The drive gear 30 can be driven at predetermined rotational speeds required to store the desired energy in the flywheel 34. The rotational speed may be near zero if the required energy is small or very high (up to the structural and vibrational limits of the system, e.g., multiple thousands of revolutions per minute) if the required energy is large.

In operation and prior to actuation of the impulse pump 15, the pusher shaft 22 is held in a fully retracted position. The pusher shaft 22 is held in a fixed position by an idler disk caliper 48 (See FIG. 4). When the idler disk brake caliper 48 is activated through movement of a hydraulic piston 50; frictional pads 52 are clamped against the surface of an idler rotor 54 and the idler rotor is held in place.

While the idler rotor 54 is held in place, a planetary gear carrier 42 must be allowed to rotate by depressurizing a hydraulic cylinder 56. If both the idler rotor 54 and the pusher shaft 22 are simultaneously held in place, all internal components of the pump 15 will be forced to stop. A planetary gear carrier brake caliper 46 is released by depressurizing the hydraulic cylinder 56 (See FIG. 5). The depressurization of the hydraulic cylinder 56 eliminates the contact forces between friction pads 60 and the planetary gear carrier 42 so that the planetary gear carrier is free to rotate.

Figure 7:
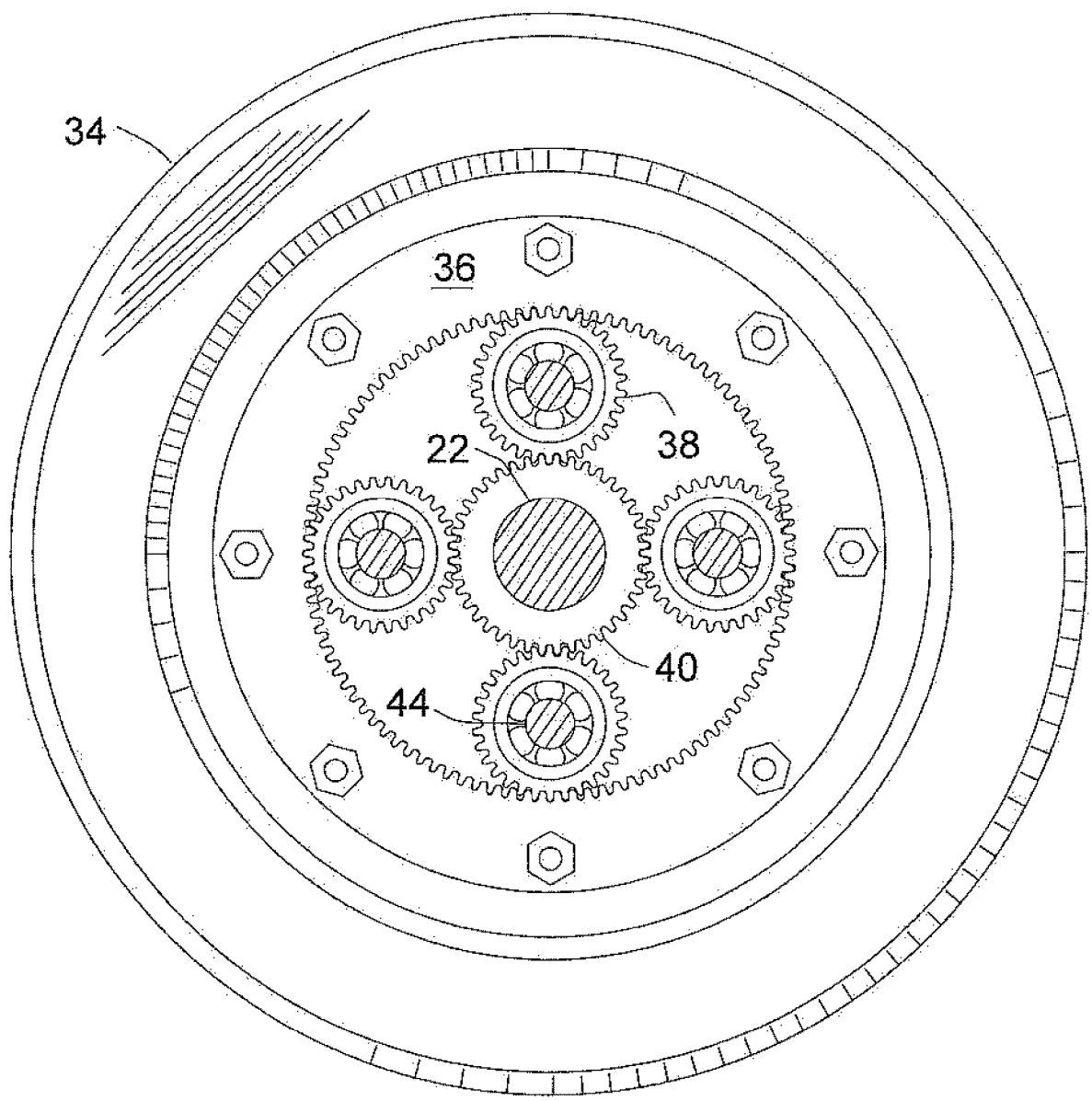
FIG. 7 depicts a partial cross-section of the impulse pump with the cross section showing an associated ring gear, planetary gears, planetary gear carrier, sun gear, and pusher shaft with the view taken from reference lines 7-7 of FIG. 2.

FIG. 7 depicts the flywheel 34 attached to a ring gear 36. The ring gear 36 is a component in the gear box housing 20. The ring gear 36 meshes with planetary gears 38 and the planetary gears mesh with a sun gear 40. The sun gear 40 is attached to the pusher shaft 22. The planetary gears 38 are attached to the planetary gear carrier 42 (not shown in FIG. 7) by planetary gear shafts 44.

Referring again to FIG. 2, while the plunger 72 is fully retracted and the pusher shaft 22 is held stationary; the drive motor 17 can accelerate the flywheel 34 to a desired speed. In this way, energy is stored in the flywheel 34 in the form of rotational kinetic energy. Through kinematics of the planetary gear 38, the planetary gear carrier 42 rotates at a fraction of the rotational speed of the flywheel 34.

To convert the rotational energy of the flywheel 34 to a linear motion of the hydraulic piston 50; the idler rotor 54 is released by depressurizing the idler brake caliper 48. The planetary gear carrier 42 is subsequently decelerated by actuating the brake caliper 46. The planetary gear carrier brake caliper 46 is mounted to a positioning plate 58.

Figure 5:
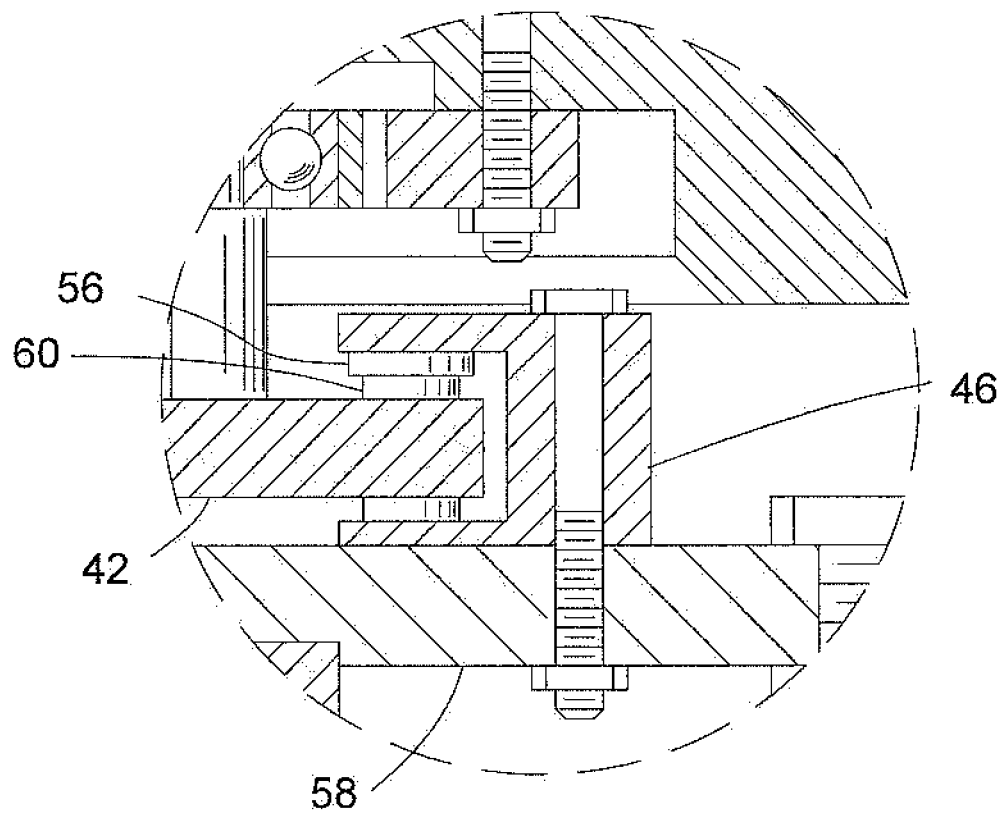
FIG. 5 depicts an enlarged view taken from as sectioned area 5-5.
Figure 6:
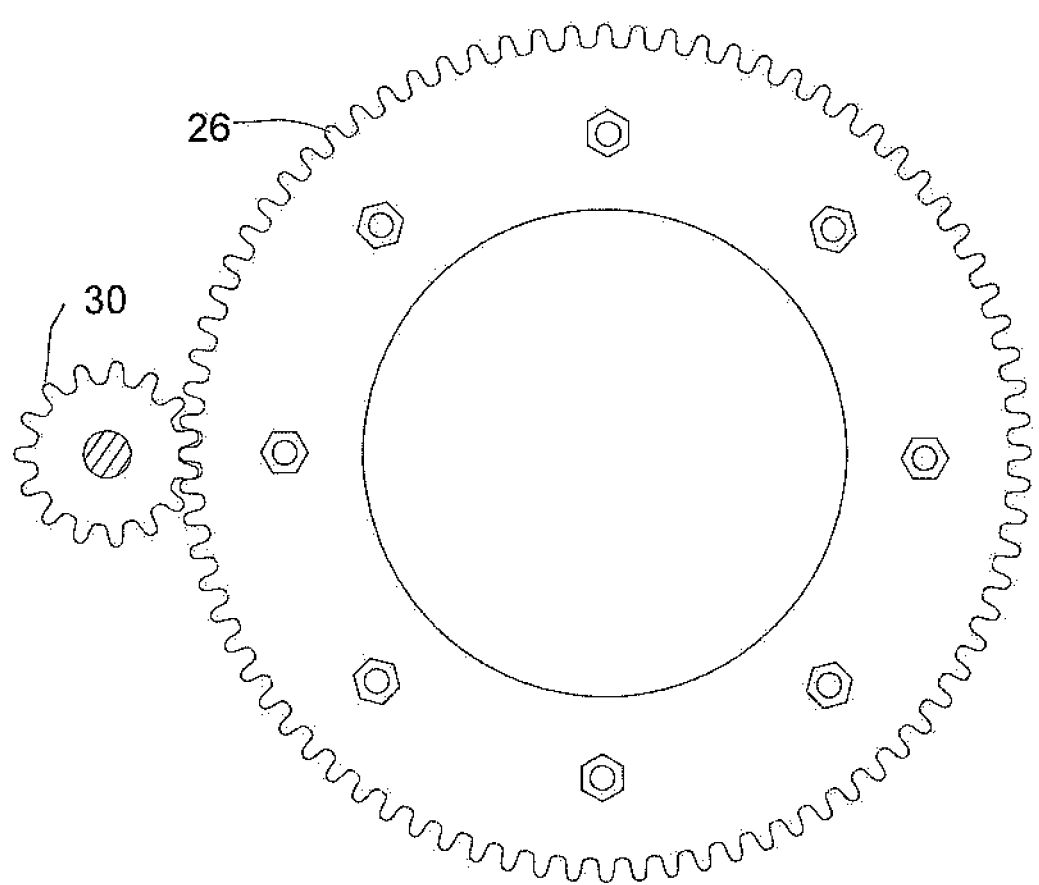
FIG. 6 depicts a partial cross-section of the impulse pump with the cross-section showing as associated drive gear engaged with a flywheel rim gear with the view taken from reference lines 6-6 of FIG. 2.

The planetary gear carrier brake caliper 46 is activated through expansion of the hydraulic cylinder clamping frictional pads 60 against the surface of the planetary gear carrier 42 (See FIG. 5). In response to the clamping applied to the planetary gear carrier 42; the flywheel 34 experiences a decelerating torque while the pusher shaft 22 experiences an accelerating torque.

Figure 8:
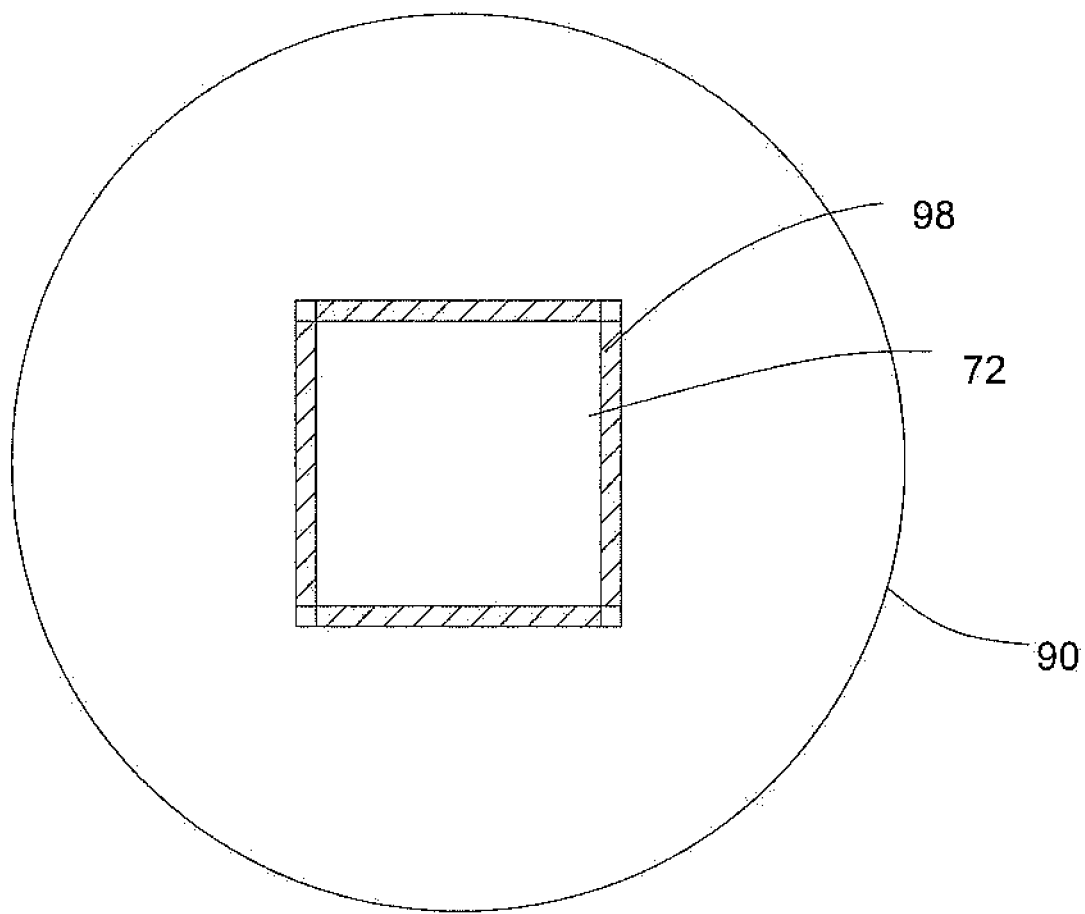
FIG. 8 depicts a cross-section of the plunger placement in the head block of the impulse pump of the present invention.

As shown in FIG. 8, the plunger 72 has a square cross-section and is only free to move along a central pump axis 62 of the impulse pump 15. The sleeve bearings 98 are affixed to the head block 90 to ease axial motion while the plunger 72 is under torsional loads.

Figure 9:
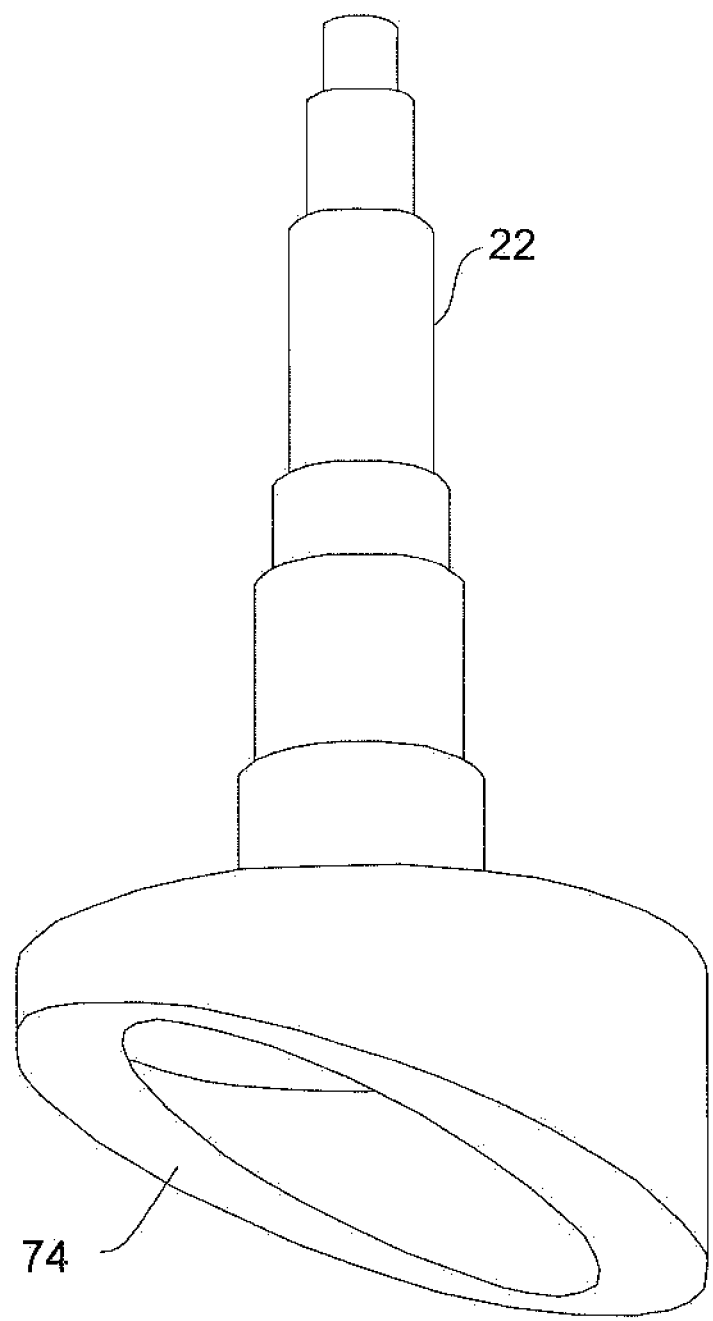
FIG. 9 depicts an isometric view of a pusher shaft of the present invention with the view also showing the shape of an associated cam race-way.

The pusher shaft 22, shown in detail in FIG. 9, includes the contoured cam race-way 74. The cam race-way 74 is a surface machined onto an end of a large diameter portion of the pusher shaft 22 to form a barrel cam. Barrel cams are well known in the art as a means to convert rotational motion to linear motion. The cam function is realized when the pusher shaft 22 rotates and the elevation of the race-way contact point changes.

The elevation of the race-way contact point is defined as the distance along a line parallel to the pump axis 62 measured from a fixed point on a plane perpendicular to an axis of the pusher shaft 22 to the point at which the cam race-way 74 contacts the contacts the cam roller 76. Over the course of one half revolution of the pusher shaft 22; the elevation of the race-way contact point varies from a maximum distance from the nozzle 92 to a minimum distance.

Figure 10:
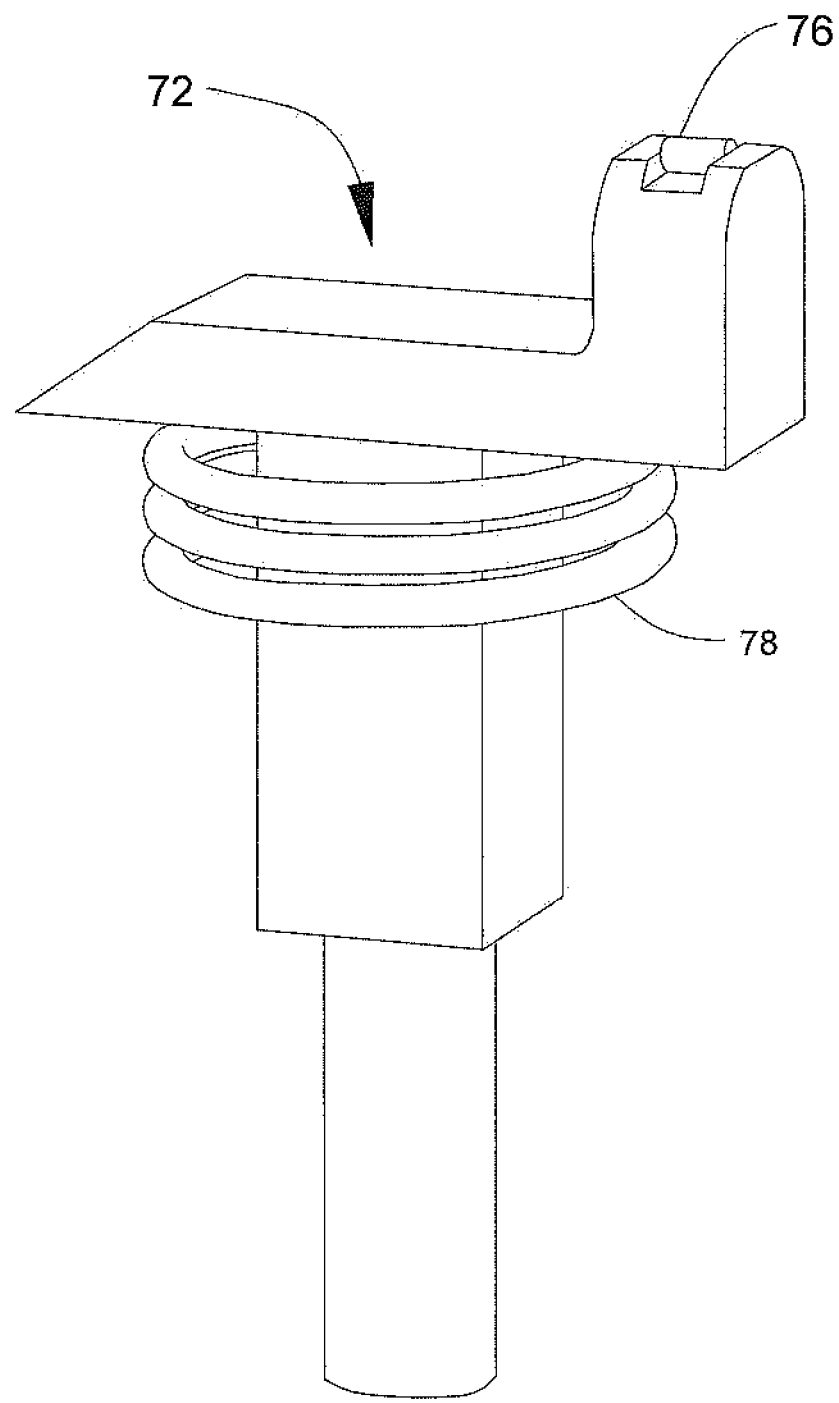
FIG. 10 depicts an isometric view of a plunger of the present invention with the view showing the integral cam roller and spring of the pump.
Figure 11A:
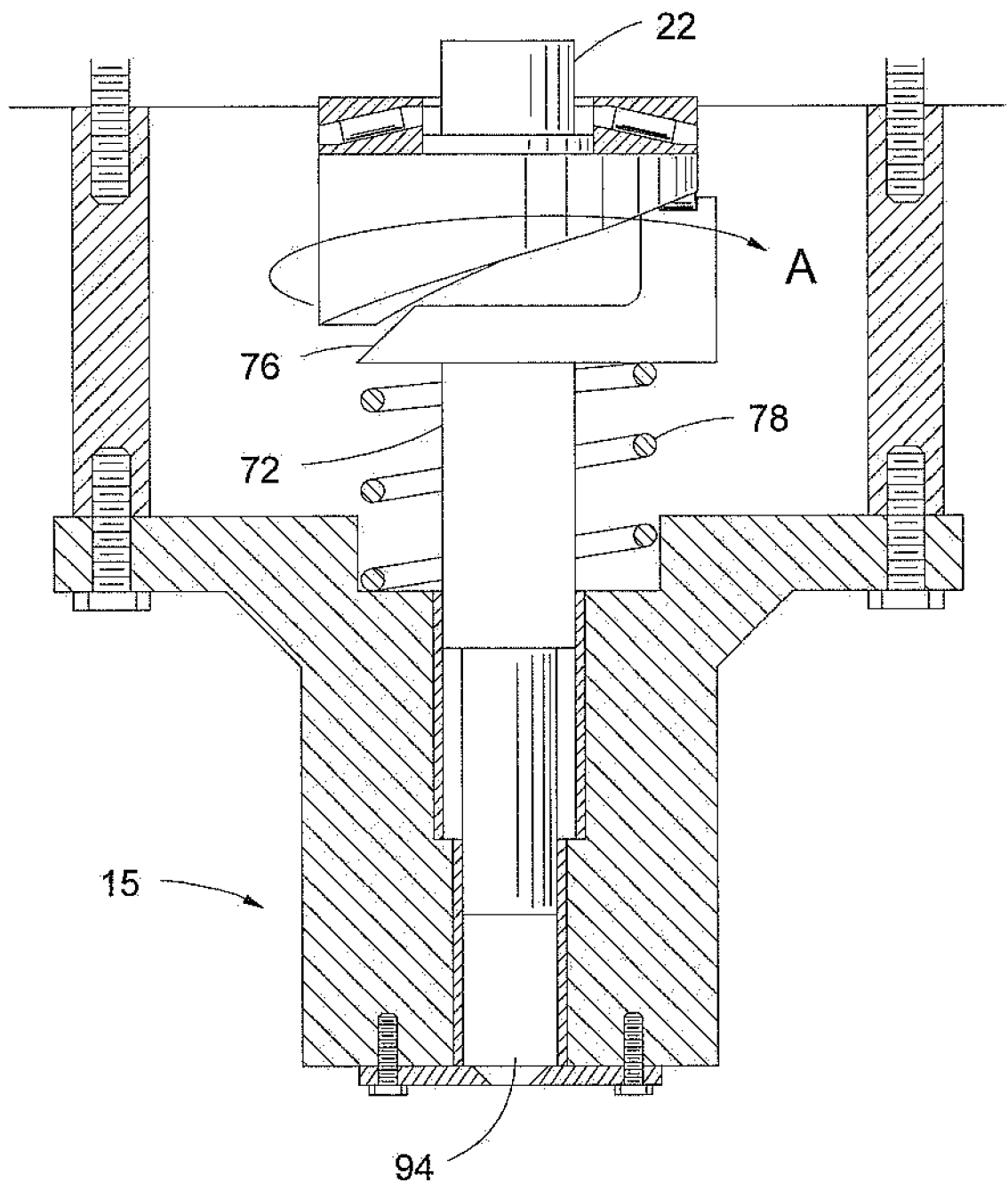
FIG. 11A-11D depict the plunger, spring, head block, nozzle, and pusher shaft of the present invention in four phases of an actuation cycle of the pump.
Figure 11B:
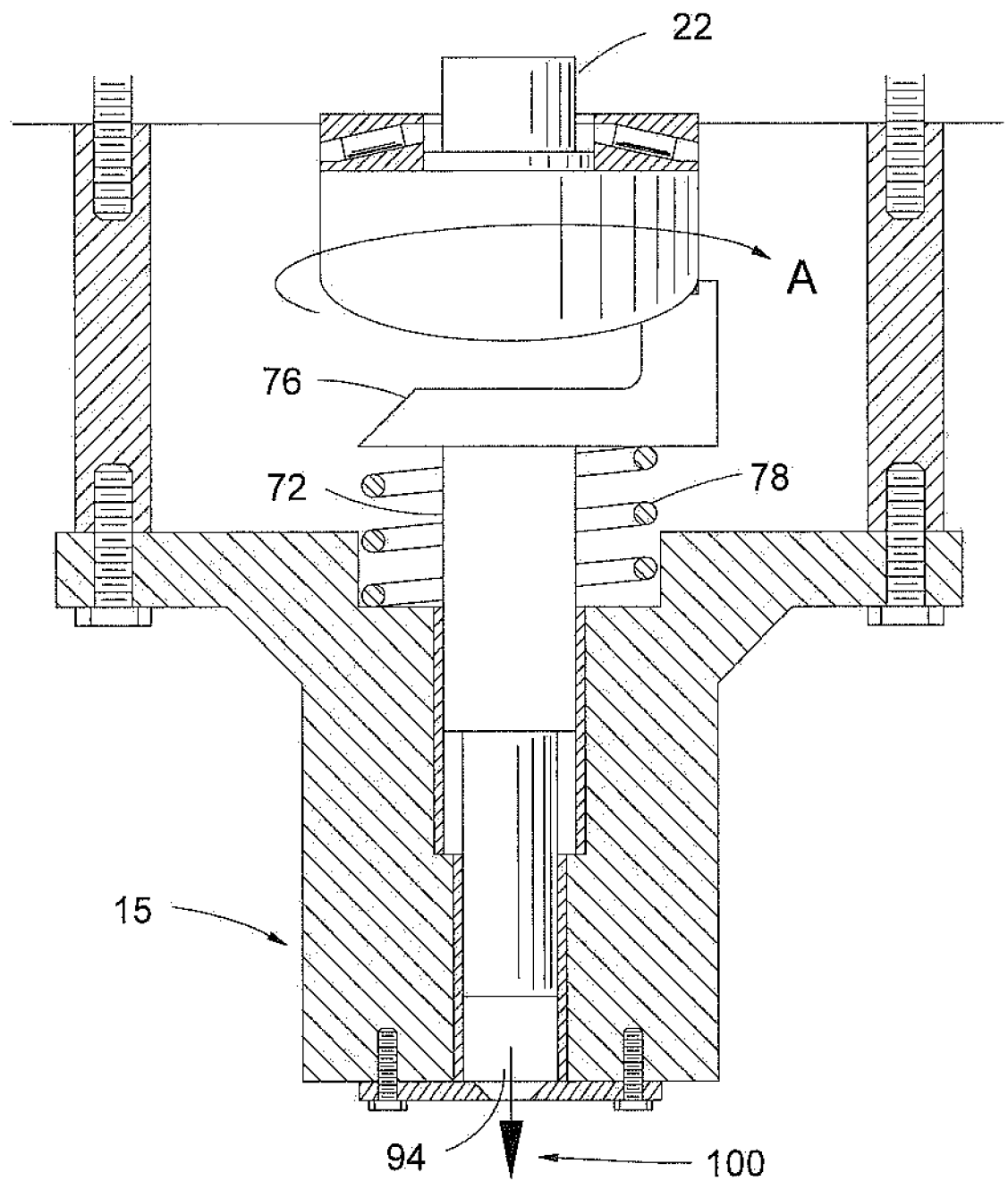
Figure 11C:
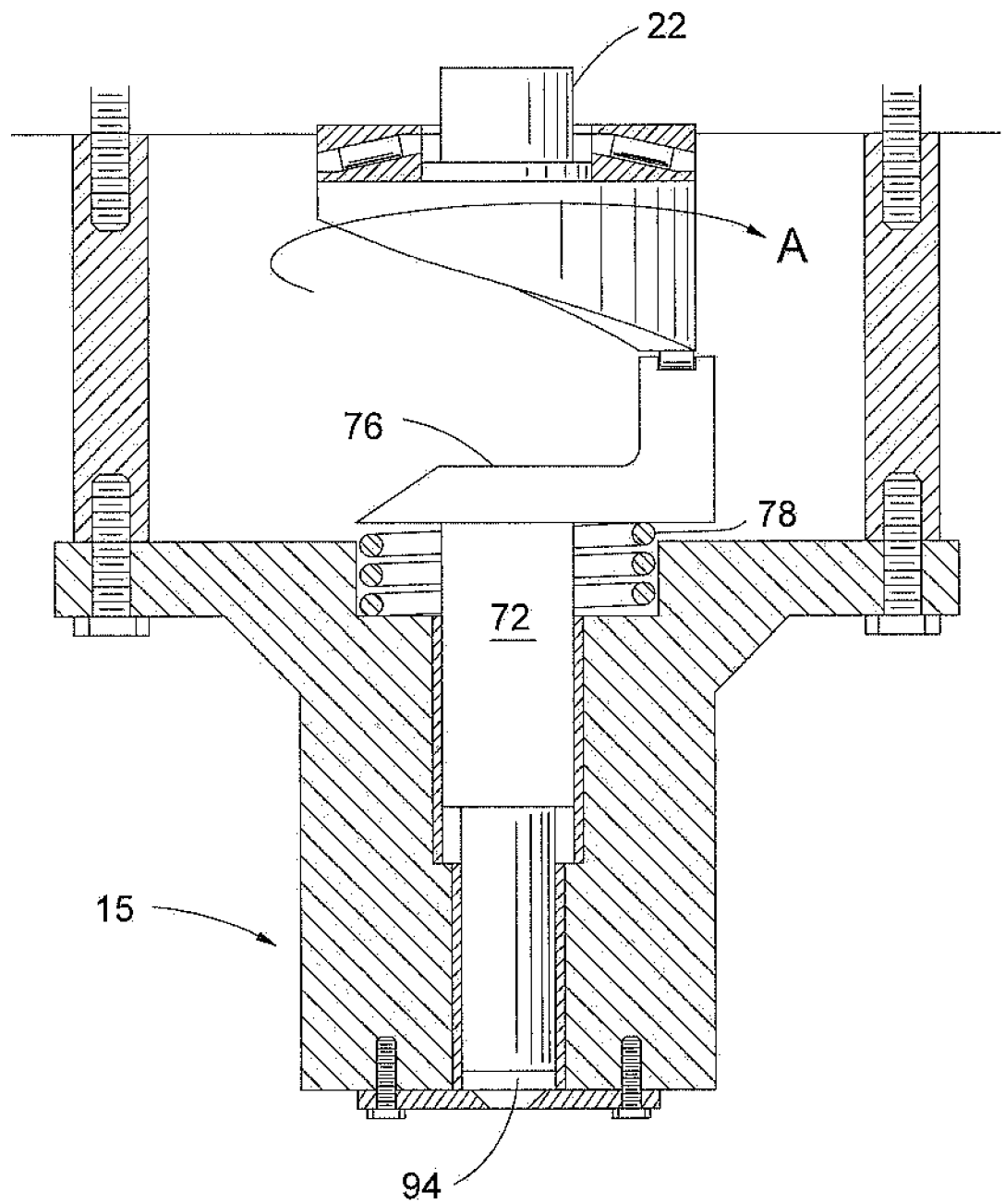
Figure 11D:
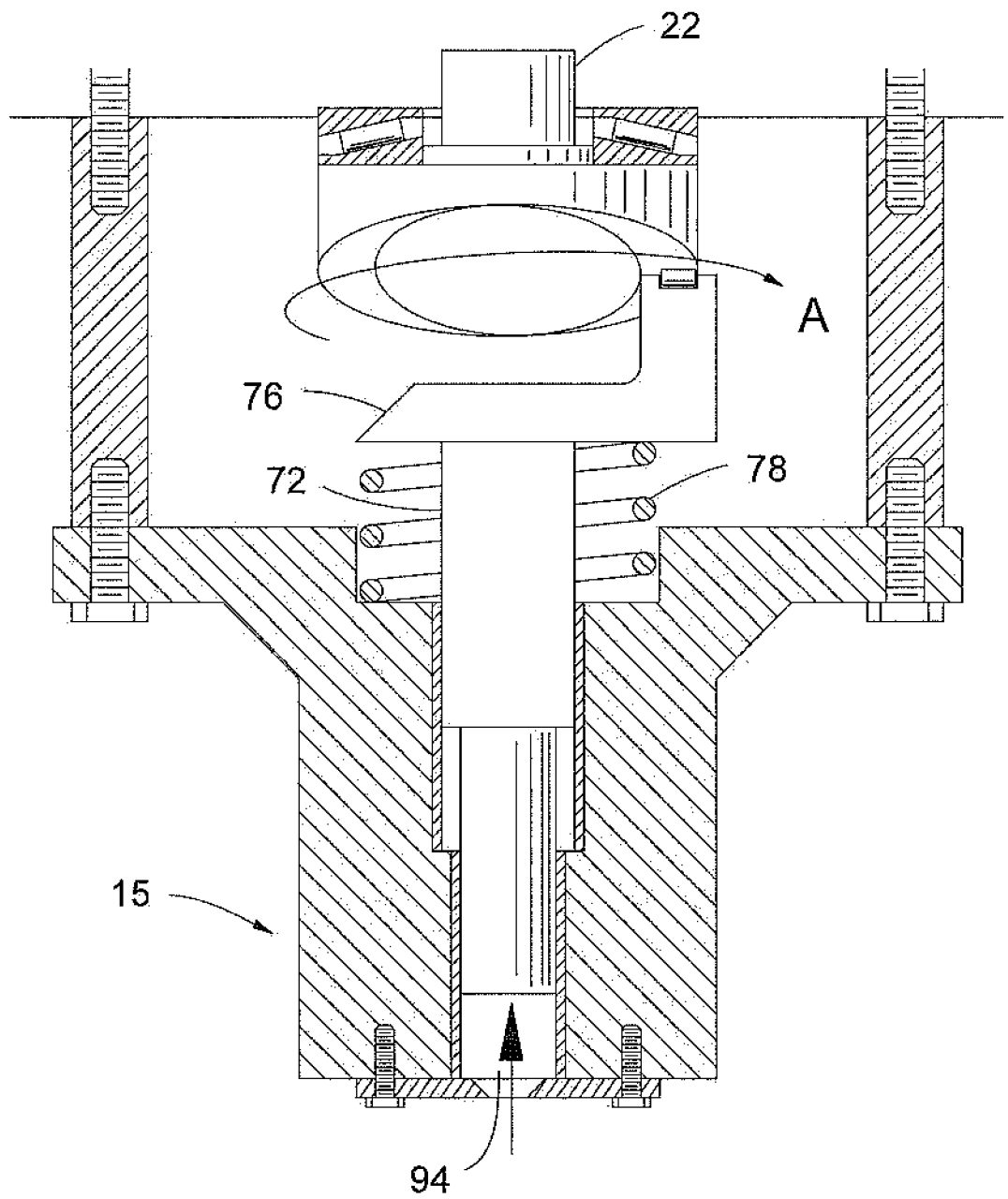
Figure 12A:
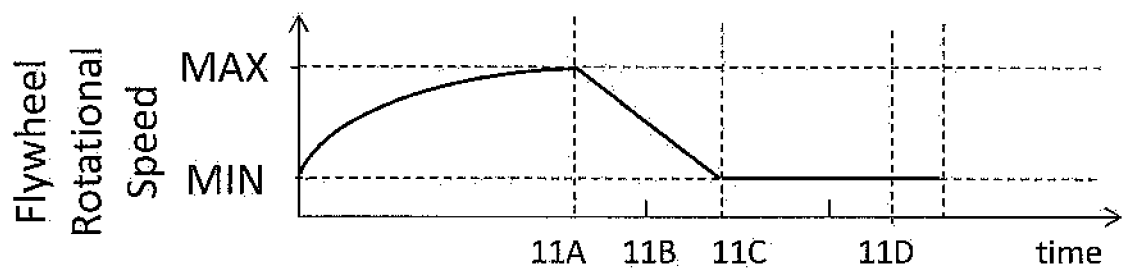
FIG. 12A-12D show the rotational speed of the flywheel and the rotational angle of the pusher shaft along with sequencing of a planetary gear carrier brake caliper and an idler disk brake caliper referenced to the four phases of an actuation cycle of the pump.
Figure 12B:
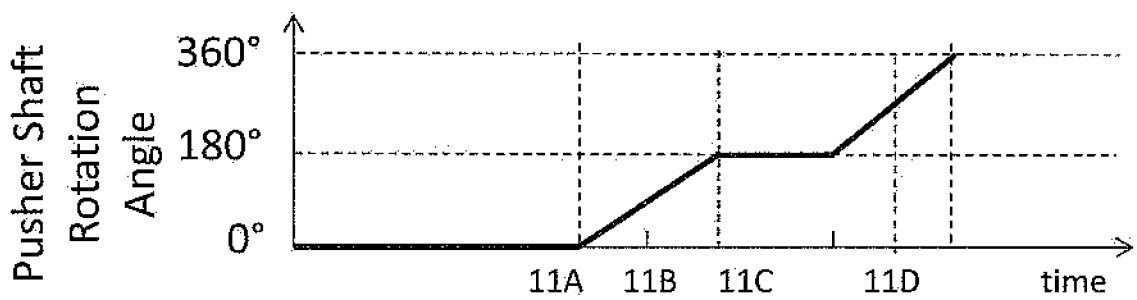
Figure 12C:
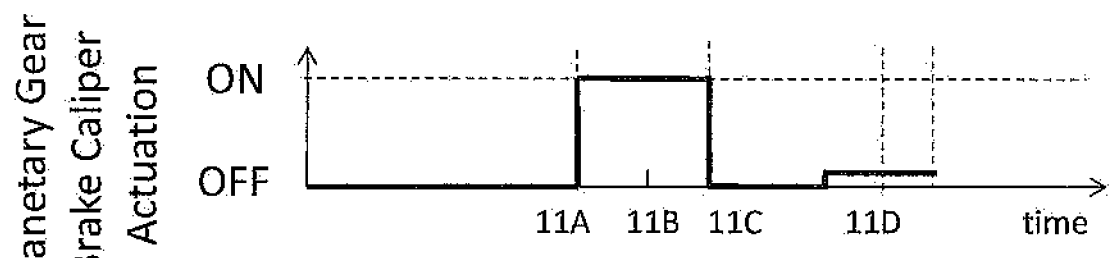
Figure 12D:
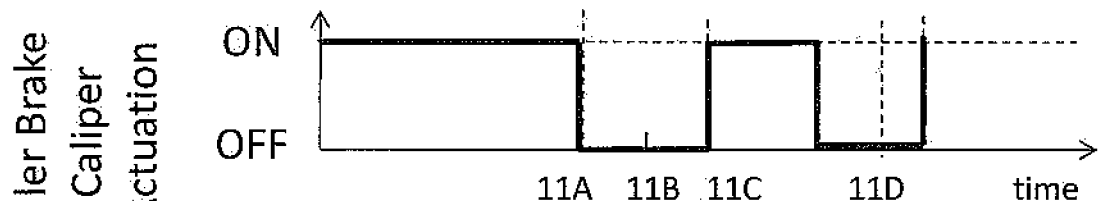

The plunger 72, shown in detail in FIG. 10, is attached to the cam roller 76 that contacts the cam race-way 74 at a fixed rotational location. The plunger 72 does not rotate relative to the head block 90. As the pusher shaft 22 rotates and the elevation of the race-way contacts point varies from a maximum distance from the nozzle 92 to a minimum distance; the plunger 72 is forced downward and axially through contact of the cam roller 76 with the cam race-way 74 and a jet of fluid 100 is formed at the nozzle.

As the pusher shaft 22 rotates and the elevation of the race-way contact point varies from a minimum distance from the nozzle 92 to a maximum distance; the spring 78 forces upward motion of the plunger 72. The upward force maintains contact between the cam roller 76 and the cam race-way 74. The upward motion of the plunger 72 draws fluid into the reservoir 94 thru the nozzle 92. Thrust bearings 82 allow the pusher shaft 22 to rotate under axial loads (See FIG. 11 for rotation of the pusher shaft).

Returning to FIG. 2, an angular position monitoring sensor 64 is included to assist in an actuation sequencing of the planetary gear carrier brake caliper 46 and the idler disk brake caliper 48. The monitoring sensor 64 detects angularly positioned markings placed on the circumference of the idler rotor 54 to establish a rotational position of the rotor.

FIG. 11A, FIG. 11B, FIG. 11C, and FIG. 11D depict four positions of the pusher shaft 22 and the plunger 72 during a rotation of the pusher shaft. In position 11A, the flywheel 34 is at full rotational speed (as indicated by direction arrow "A"); the plunger 72 is fully retracted; the reservoir 94 is full of liquid; and the plunger is held in position by the idler brake caliper 48 (the flywheel and idler brake caliper are not shown in this figure). The impulse jet 100 is initiated by releasing the idler brake caliper 48 and actuating the planetary gear carrier brake caliper 46 (the brake caliper is not shown in this figure). Through transfer of forces from the planetary gear carrier brake caliper 46 to the flywheel 34; the flywheel is decelerated and the pusher shaft 22 is rotated (as indicated by direction arrow "A").

In position 113, the plunger 72 is forced downward through the cam roller 76 as the contact point with the cam race-way 74 moves downward. Liquid is forced from the reservoir 94 as the plunger 72 moves downward.

In position 11C, the plunger 72 is at its lowest position. The planetary gear carrier brake caliper 46 is released and the idler brake caliper 48 is engaged to stop rotation of the pusher shaft 22. The angular position monitoring sensor 64 monitors rotation of the pusher shaft 22 to time actuation and release of the calipers 46 and 48.

Movement from position 11C to position 11D is achieved by releasing the idler disk brake caliper 48. Fluid is drawn into the reservoir 94 by releasing the idler disk brake caliper 48 and partially engaging the planetary gear carrier brake caliper 46. Engaging the planetary gear carrier brake caliper 46 causes the pusher shaft 22 to rotate. During the rotation, the contact points between the cam roller 76 and the cam race-way 74 translates upward parallel to the pump axis 62 while drawing fluid into the reservoir 94 through the nozzle 92. Contact between the cam roller 76 and the cam race-way 74 is maintained through action of the spring 78. The spring 78 provides the force necessary to move the plunger 72.

The planetary gear carrier brake caliper 46 is released and the idler brake caliper 48 is engaged as the plunger 72 returns to a top position. The angular sensor 64 is monitored so that the motion of the plunger 72 is stopped at the correct position. The pulse jet sequence can then be repeated once the flywheel 34 has returned to a full pre-pulse rotational speed.

FIGS. 12A-12D show the rotational speed of the flywheel and the rotational angle of the pusher shaft 22 along with the sequencing the planetary gear carrier brake caliper 46 and the idler disk caliper brake 48 referenced to the four phases of the actuation cycle of the pump 15.

The primary advantages of the impulse pump 15 are twofold. First, the impulse pump 15 enables the rapid conversion of rotational kinetic energy stored in a flywheel 34 to a linear motion of the plunger 72 to form the short duration impulse jet 100. The process of collecting energy from the low power drive motor 17 over a long period relative to the duration of the impulse jet 100 and rapidly converting that energy allows the overall size of the pump 15 to be small as compared to a device engineered with a drive motor capable of producing the instantaneous power requirements of the water jet production.

Second, the caliper brakes 46, 48 are sequenced to apply forces to components within the planetary gear system to rapidly decelerate and accelerate components within the impulse pump 15 in order to produce a rapid and forceful motion of the plunger 72. The rapid motion of the plunger 72 creates the water (impulse) jet 100. The rapid motion of the plunger 72 may be used for other applications other than the formation of a water jet. The impulse pump 15 with rapid motion of the plunger 72 may be used in punch presses or similar devices where short duration forceful motion of a linear actuator is needed.

What has thus been described is a device for creating a short duration and high velocity water jet 100. The short duration and high velocity water jet 100 is created by the impulse pump 15 of the present invention by storing energy in a flywheel 34 that is rapidly converted to linear motion of a piston or plunger 72. The linear motion of the plunger 72 forces water through a nozzle 92 to form the water jet 100.

Central to the energy conversion process are the two caliper brakes 46, 48 that provide deceleration and restraining forces to components of the impulse pump 15. The pusher shaft 22 is held in place as the flywheel 34 is accelerated. When the flywheel 34 is at full speed, the idler disk caliper brake 48 is released and the planetary gear carrier brake caliper 46 is applied. A counter-torque is transferred to the pusher shaft 22 in reaction to the torque applied to the planetary gear carrier 42 by the planetary gear carrier brake caliper 46.

This counter torque rotates the pusher shaft 22, which in turn forces the plunger 72 downward and expels pressurized fluid 100 from the reservoir 94 thru the nozzle 92. Work done on the system through application of the planetary gear carrier brake caliper 46 is proportional to the frictional force applied by the planetary gear carrier brake caliper times the speed of the pump components on which the disk brake acts.

The energy to perform that work is provided by the flywheel 34 and deceleration of the flywheel. Energy from the flywheel 34 is lost through the generation of heat during application of the system brake and transferred to other system components through a rotational acceleration of the pusher shaft 22, linear acceleration of the plunger 72, and work done on the fluid that forms the pressurized fluid jet 100.

The drive motor 17 for the impulse pump 15 can be comparatively small because the instantaneous power requirements of the drive system are low. Because acceleration of the flywheel 34 can be slow; the drive motor 17 need only have power slightly in excess of that required to overcome system losses at a maximum flywheel rotational speed.

Many modifications and variations of the present invention may become apparent in light of the above teachings. A number of alternative devices could be constructed using the same general methods discussed herein to construct devices that would be optimized for a particular purpose. For example: the bearing types and configurations may be different than as shown; disk brake calipers could be replaced with drum, inductive, hydraulic, or band brakes; and the barrel cam and follower design could be replaced with a swashplate assembly.

In light of the above, it is therefore understood that within the scope of the appended claims, the invention may be practiced otherwise than as specifically described.

What is claimed is:

1. A method to produce energy for an impulse water jet from a pump, said method comprising the steps of: providing with the pump a motor connected to a flywheel connected to a planetary gear transmission connected to a caliper brake connected to a pusher shaft connected to a cam roller connected to a plunger connected to a reservoir connected to a nozzle; generating rotational kinetic energy with the motor; storing a rotational kinetic energy in the flywheel; decelerating the planetary gear carrier using the caliper brake; decelerating the flywheel subsequent to said decelerating the planetary gear carrier step; releasing the stored kinetic energy subsequent to said decelerating the planetary gear step to transmit the stored kinetic energy from the flywheel to the pusher shaft; accelerating and rotating the pusher shaft subsequent to said energy releasing step; converting the rotation of the pusher shaft through a contact point of the cam roller from the pusher shaft to linear motion and translational motion of the plunger; and releasing a impulse water jet energy from the reservoir through the nozzle subsequent to said converting step with the translational motion.

* * * * *